United States Patent
Rudolfi et al.

(10) Patent No.: US 10,266,041 B2
(45) Date of Patent: Apr. 23, 2019

(54) LOCKING DEVICE HAVING A LOCKING HOOK AND A DETECTION DEVICE FOR A LOCKING-HOOK POSITION

(71) Applicant: Webasto SE, Stockdorf (DE)

(72) Inventors: Christian Rudolfi, Stockdorf (DE); Franz Haberl, Stockdorf (DE); Magnus Sviberg, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/639,353

(22) Filed: Jun. 30, 2017

(65) Prior Publication Data
US 2018/0015813 A1 Jan. 18, 2018

(30) Foreign Application Priority Data

Jul. 14, 2016 (DE) .................. 10 2016 112 963

(51) Int. Cl.
| | |
|---|---|
| *B60J 7/12* | (2006.01) |
| *B60J 7/185* | (2006.01) |
| *F16H 19/00* | (2006.01) |
| *F16H 21/44* | (2006.01) |

(52) U.S. Cl.
CPC .......... *B60J 7/1291* (2013.01); *B60J 7/1204* (2013.01); *B60J 7/1858* (2013.01); *F16H 19/001* (2013.01); *F16H 21/44* (2013.01)

(58) Field of Classification Search
CPC ...... B60J 7/1851; B60J 7/0573; B60J 7/1265; F16B 19/10; F16B 19/1036; F16C 11/04; F16C 17/10; F16C 33/08

USPC .......... 296/121, 107.08, 107.09; 324/207.2, 324/207.21; 318/265, 286, 467
See application file for complete search history.

(56) References Cited

U.S. PATENT DOCUMENTS

| | | | |
|---|---|---|---|
| 5,225,747 A | 7/1993 | Helms et al. | |
| 5,413,390 A * | 5/1995 | Filippi | B60J 7/192 292/110 |
| 6,213,534 B1 * | 4/2001 | MacFarland | B60J 7/1851 292/33 |
| 6,957,842 B1 * | 10/2005 | Garska | B60J 7/1204 293/121 |
| 7,226,110 B2 * | 6/2007 | Doncov | B60J 7/1851 292/DIG. 5 |

(Continued)

FOREIGN PATENT DOCUMENTS

| | | |
|---|---|---|
| DE | 4111646 C2 | 12/1994 |
| DE | 102 01 871 A1 | 1/2003 |

(Continued)

*Primary Examiner* — D Glenn Dayoan
*Assistant Examiner* — Sunsurraye Westbrook
(74) *Attorney, Agent, or Firm* — Fitch, Even, Tabin & Flannery, LLP

(57) ABSTRACT

A locking device for a convertible vehicle is proposed, comprising a locking support, a locking hook, which can be shifted in a translational and/or rotational manner so as to be displaced between a release position and a locked position, and a driving mechanism for the locking hook, said driving mechanism comprising a driving element, which is driven by a driving motor and drives the locking hook, as well as a detection device for detecting a position of the driving element. The detection device is a sensor, which continuously detects the position of the driving element with respect to the locking support.

11 Claims, 21 Drawing Sheets

(56) References Cited

U.S. PATENT DOCUMENTS

| | | | |
|---|---|---|---|
| 8,141,932 B2* | 3/2012 | Schumacher | B60J 7/1851 |
| | | | 296/121 |
| 2009/0284252 A1 | 11/2009 | Burgdorf et al. | |
| 2012/0086232 A1* | 4/2012 | Wilke | B60J 7/1851 |
| | | | 296/121 |

FOREIGN PATENT DOCUMENTS

| | | |
|---|---|---|
| DE | 102005046822 A1 | 5/2006 |
| DE | 202011002078 U1 | 5/2011 |
| DE | 102010044702 A1 | 3/2012 |
| DE | 102015216923 A1 | 3/2017 |
| EP | 0359853 A1 | 9/1988 |

* cited by examiner

LOCKING DEVICE HAVING A LOCKING HOOK AND A DETECTION DEVICE FOR A LOCKING-HOOK POSITION

CROSS-REFERENCE TO RELATED APPLICATIONS

This application claims priority from German Application No. 10 2016 112 963.1, filed Jul. 14, 2016, which is hereby incorporated herein by reference in its entirety for all purposes.

FIELD

The invention relates to a locking device of a top of a convertible vehicle having the features of the preamble of claim 1 and to a top of a convertible vehicle having a locking device of this kind.

BACKGROUND

A locking device of the kind mentioned above is known from document DE 10 2010 044 702 A1 and serves for fixing a rigid roof element, which can be a front bow of a folding top or a rigid roof segment of a retractable hard top (RHT), to the front cowl of the vehicle in question. The locking device comprises a locking support, which serves as a casing and which can be connected to the rigid roof element. Furthermore, the locking device comprises a locking hook, which is pivotably mounted to a crosshead movable in the locking support. The locking hook can be displaced between a raised locked position and a lowered release position by moving the crosshead in the locking support. In the locked position, a hook section of the locking hook is engaged with a corresponding locking element, which is formed on the front cowl. For driving, the crosshead is connected to a driving disk via a linkage arrangement, said driving disk being able to be driven in a rotational manner by means of a driving motor. The driving disk comprises a switching gate at its upper side, said switching gate interacting with two end-position sensors, one of which being allocated to the release position of the locking hook while the other is allocated to the locked position of the locking hook. Intermediary positions of the locking hook cannot be detected by the sensors, which are realized as microswitches. In fact, only the end positions of the locking hook can be prompted.

Alternatively, it is known that the position of a locking hook can be detected by means of a Hall sensor, which interacts with a driving wheel of a driving motor and counts the rotations of the driving motor for detecting the position of the locking hook. In the event of a power outage, however, the current position of the locking hook would be lost in this embodiment.

When a top is displaced from the closed position to the storage position, it is necessary for the locking hook of the locking device to be retracted in order to avoid collision with a covering of the top storage compartment. If the displacing movement of the top is stopped in an intermediary position while the locking device or rather the locking hook of the locking device is not in an end position and the top is then moved in the other displacing direction, it has been necessary thus far to stop the top for a short moment until the locking hook has taken up the desired end position again. Otherwise, it would not be ensured that the locking hook has taken up its required end position, i.e. its release position or locked position, respectively, when reaching one of the top end positions.

SUMMARY

The object of the invention is to provide a locking device of the kind mentioned above, with which it is possible to continuously detect the position of the locking hook.

According to the invention, this object is attained by the locking device having the features of claim 1.

According to the invention, the position of the locking hook is therefore detected by directly or indirectly detecting the position of the driving element by means of a sensor. The position of the driving element correlates with the position of the locking hook. Thus, the position of the locking hook is known in every intermediary position at any point of the movement. If the top movement is stopped in an intermediary position, the position of the locking hook is always known, even if it is not in an end position. If the top is now moved in the opposite displacing direction, it can be calculated by a control device, which is connected to the sensor, whether the time until the top reaches its corresponding end position suffices in order to move the locking hook into a desired position. By this means, time for moving can be saved since it is not mandatory to stop the top. Moreover, intermediary positions of the locking hook can be taken up directly. Also, the position of the locking hook is not lost in the event of a power outage since the sensor does not have to be initialized.

In a preferred embodiment of the locking device according to the invention, the driving element is a driving wheel and the sensor is a rotation (angle) sensor, which continuously detects the rotational position of the driving wheel with respect to the locking support.

Alternatively, the driving element can also be a linearly displaceable element, which is driven by means of the driving motor, and the sensor can be a linear sensor, such as a linear potentiometer or a slide potentiometer, respectively.

The driving motor can be a common electric motor having a rotationally driven drive shaft. It is also conceivable for the driving motor to comprise a linear drive, such as a hydraulic drive. The linearly displaceable driving element, which can be driven by the driving motor and interacts with the linear sensor, can be the piston or the casing of the hydraulic cylinder.

The rotation sensor can be a common rotation sensor for detecting positions of rotationally driven components and can be, depending on the embodiment, a magnetically operating rotation sensor or a rotation sensor operating like a potentiometer.

In a preferred embodiment of the locking device according to the invention, the driving wheel interacts with the rotation sensor via a geardrive. The translation can be chosen such that a driven part of the rotation sensor executes a largest possible rotational movement or pivoting movement. This movement should be smaller than or equal to 360° though. By this means, the rotational position of the driving wheel and the position of the locking hook can be determined with high accuracy.

Alternatively, it is also conceivable, that the rotation sensor is directly arranged in the rotational axis of the driving wheel.

In a special embodiment of the locking device according to the invention, the geardrive comprises a gearwheel, which is a rotatable positioning wheel of the rotation sensor and which is engaged with a toothing of the driving wheel. This toothing can be the toothing in which a driving pinion for the driving wheel is engaged or be a different separate toothing having the same or differing base tangent length.

In an alternative embodiment of the locking device according to the invention, the geardrive comprises a cranking mechanism, which is realized by the driving wheel and a coupling lever and which acts on a positioning lever of the rotation sensor.

In another special embodiment of the locking device according to the invention, the driving wheel comprises a guiding track for a positioning device of the rotation sensor, said guiding track comprising a positioning lever. The positioning lever can thus be directly or indirectly guided in the guiding track of the driving wheel, said guiding track having an eccentric progression with respect to the rotation axis of the driving wheel and following a spiral curve, for example.

The positioning device comprises, for example, a coupling lever, which is guided in the guiding track via a guiding element and which is hinged to the positioning lever of the rotation sensor.

In another special embodiment of the locking device according to the invention, the positioning lever comprises an oblong hole, into which a journal engages, which is guided in the guiding track. In this special embodiment, intermediary links between the positioning lever of the rotation sensor and the driving wheel can be omitted.

In order to ensure that the positioning lever or the coupling lever is pivoted without any further degree of freedom, it is advantageous if a slotted track is provided on the locking support, said slotted track being positioned nearly radially with respect to the rotation axis of the driving wheel and a guiding journal of the positioning device of the rotation sensor is guided in the said slotted track. The slotted track therefore ensures a compulsory guide of the positioning link of the rotation sensor and thus a correct detection of the rotational position of the driving wheel. The slotted track formed on the driving wheel is a positioning curve which actuates the rotation sensor.

The invention also relates to a top of a convertible vehicle comprising a locking device of the kind mentioned above, by means of which the top or a top element can be fixed to a front cowl of the vehicle. A locking counterpart is arranged on the front cowl, said locking counterpart interacting with the hook or gripping end of the locking hook to fix the top or the top element. The locking counterpart is a bolt, for example, behind which the locking hook can engage.

Other advantages and advantageous embodiments of the subject matter of the invention are apparent from the description, the drawing and the claims.

BRIEF DESCRIPTIONS OF THE DRAWINGS

Embodiments of a top having a locking device according to the invention are illustrated in the drawing in a schematically simplified manner and are explained in more detail in the following description. In the figures, FIG. 1 shows a schematic side view of a convertible vehicle having a top which is fixed to a front cowl by means of a locking device;

DETAILED DESCRIPTION

Figure 1:
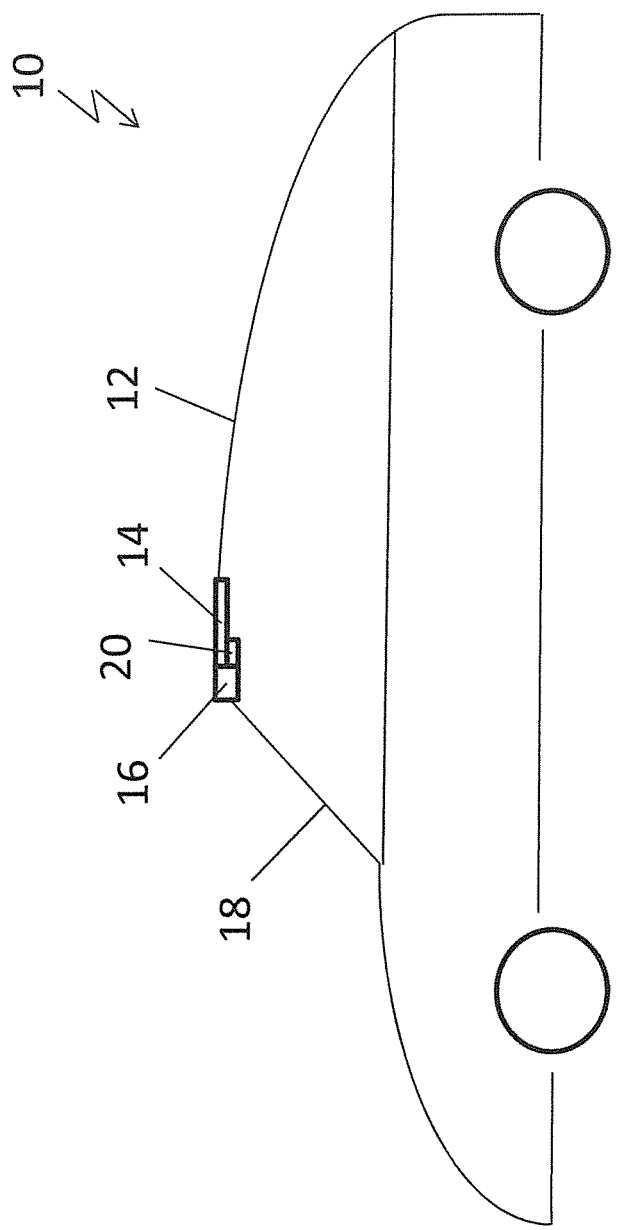
Figure 2:
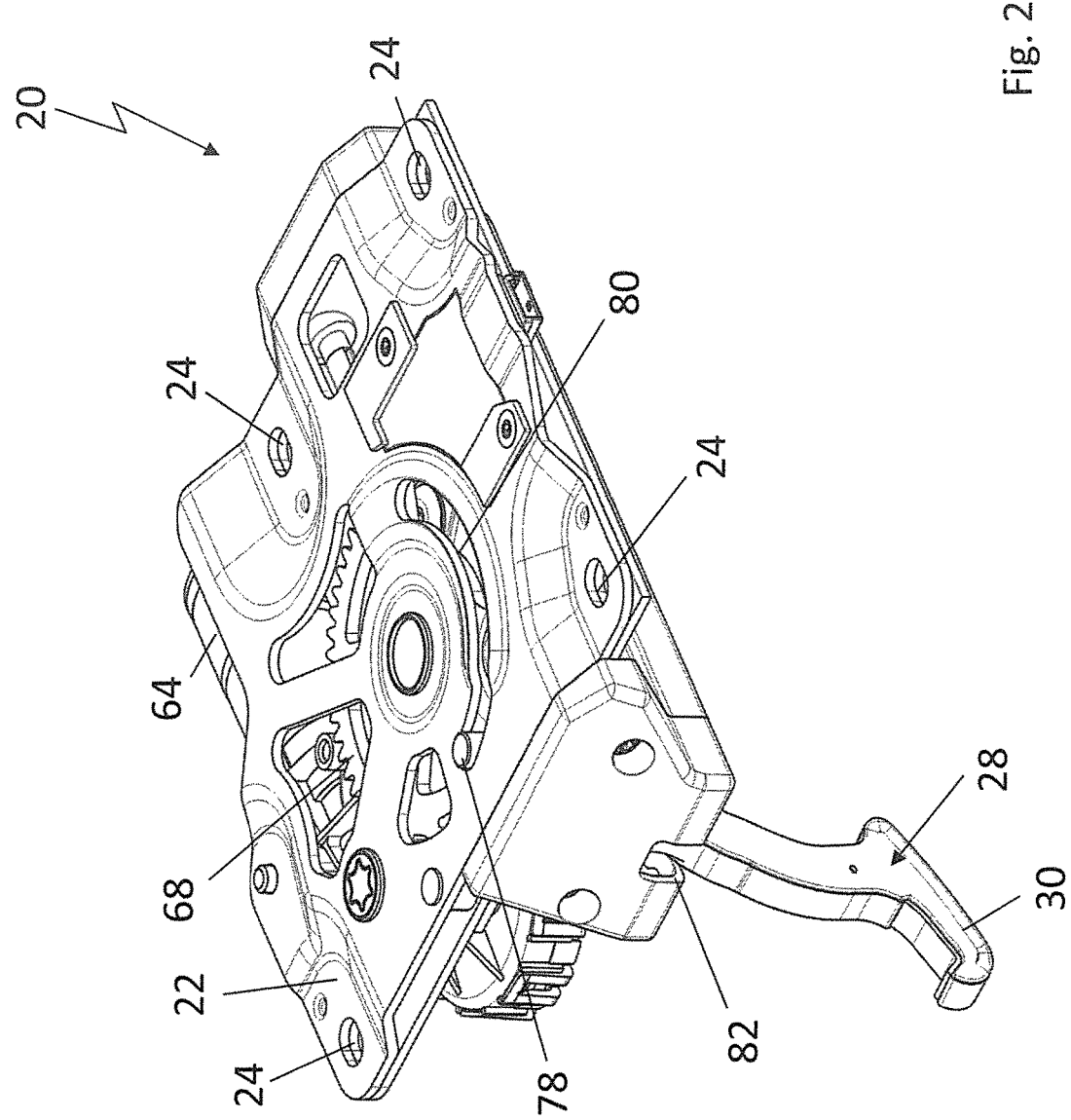
FIG. 2 shows a perspective top view of the locking device when in its release position.
Figure 3:
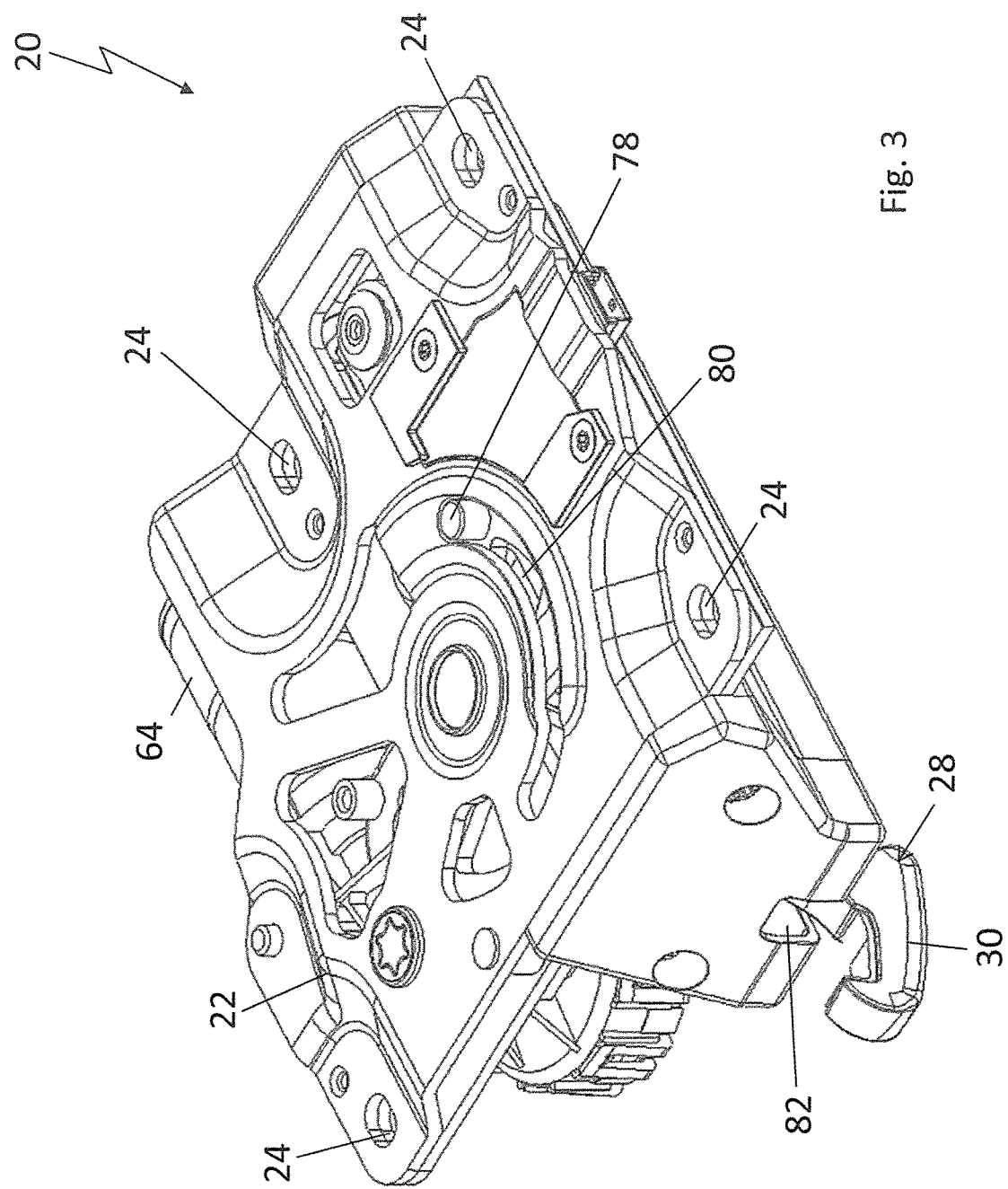
FIG. 3 shows a perspective top view of the locking device when in its locked position.
Figure 4:
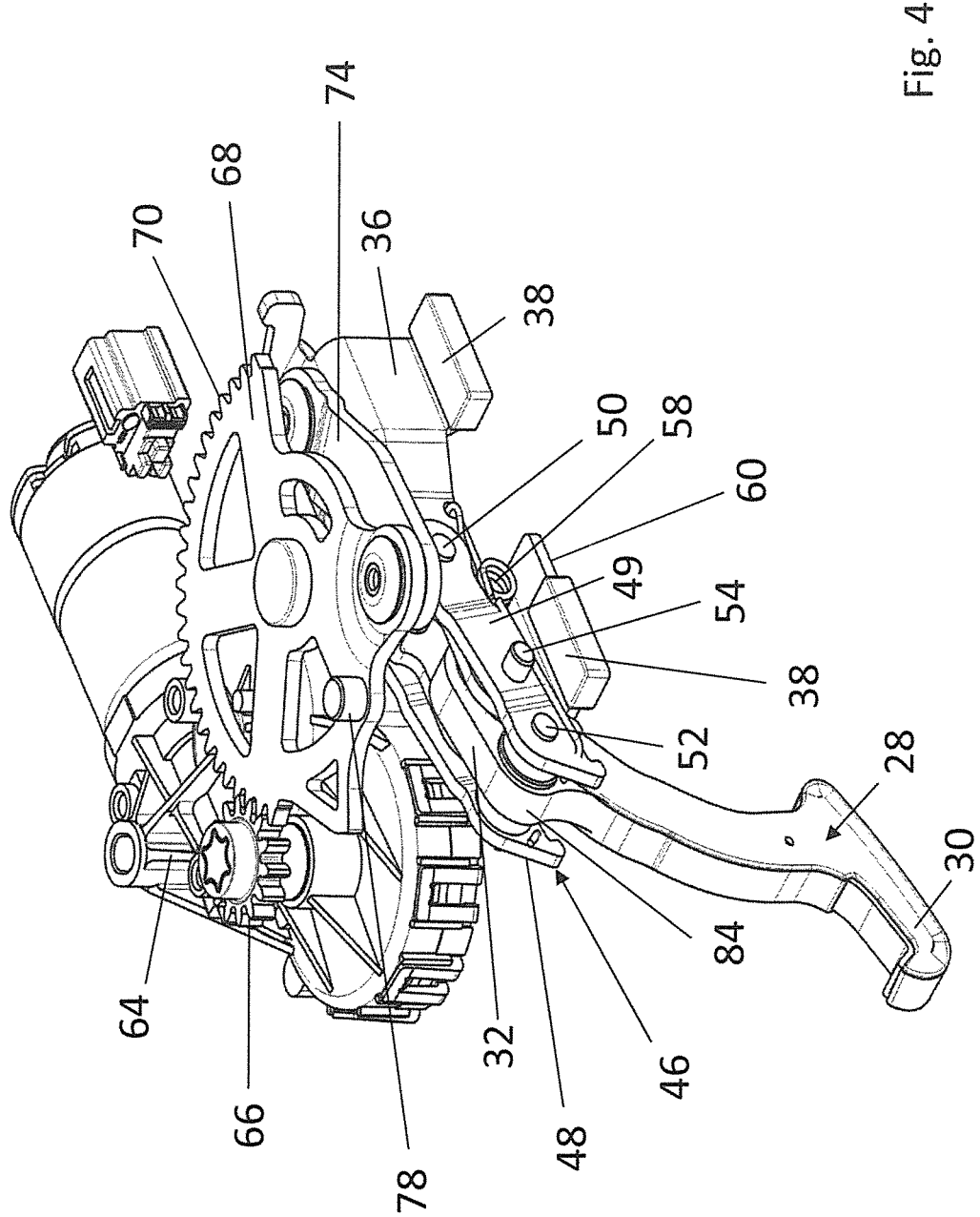
FIG. 4 shows an illustration of the locking device when in its release position corresponding to FIG. 2, but shown without a locking support.
Figure 5:
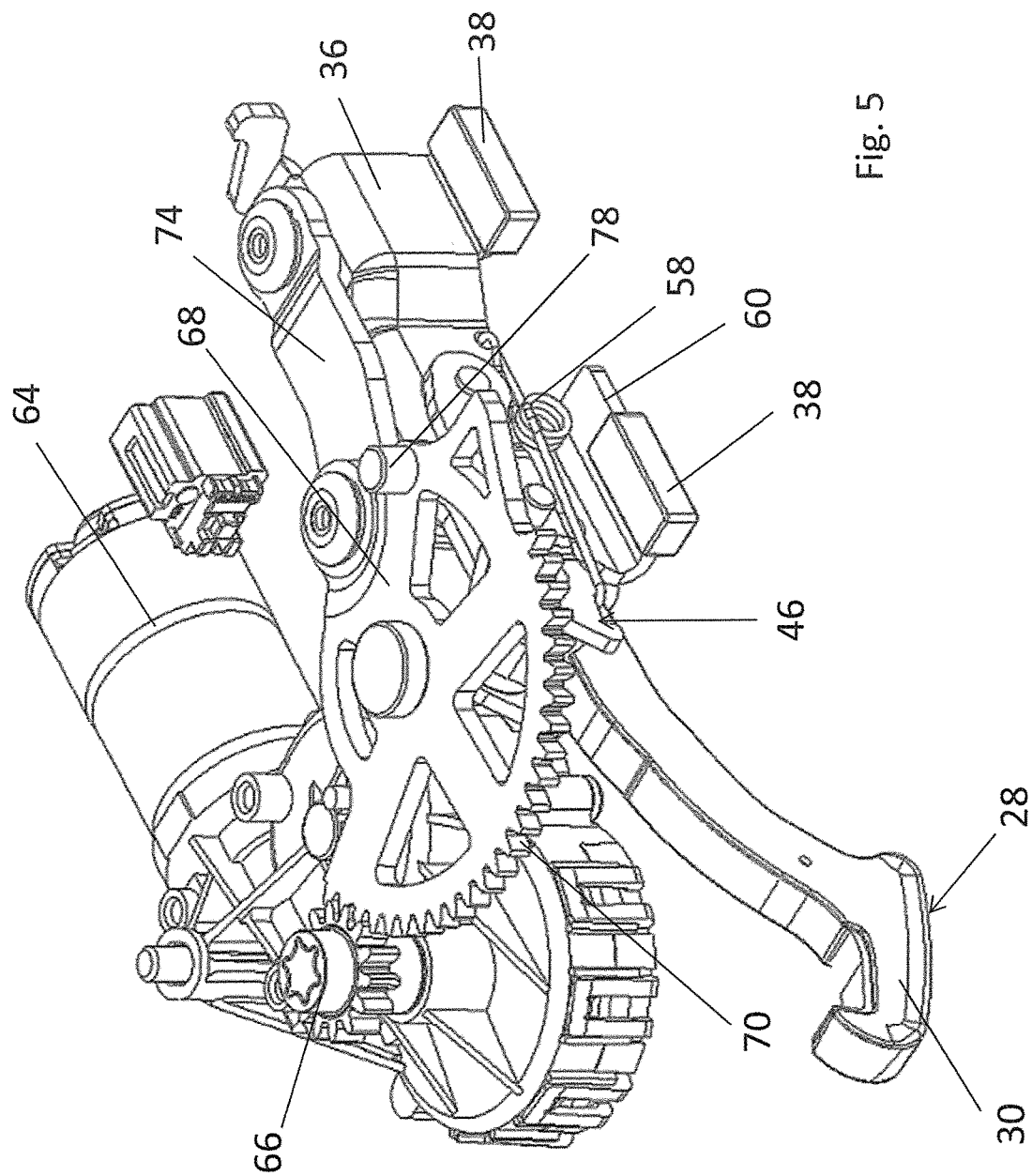
FIG. 5 shows an illustration of the locking device corresponding to FIG. 3, but in its locked position and shown without the locking support.
Figure 6:
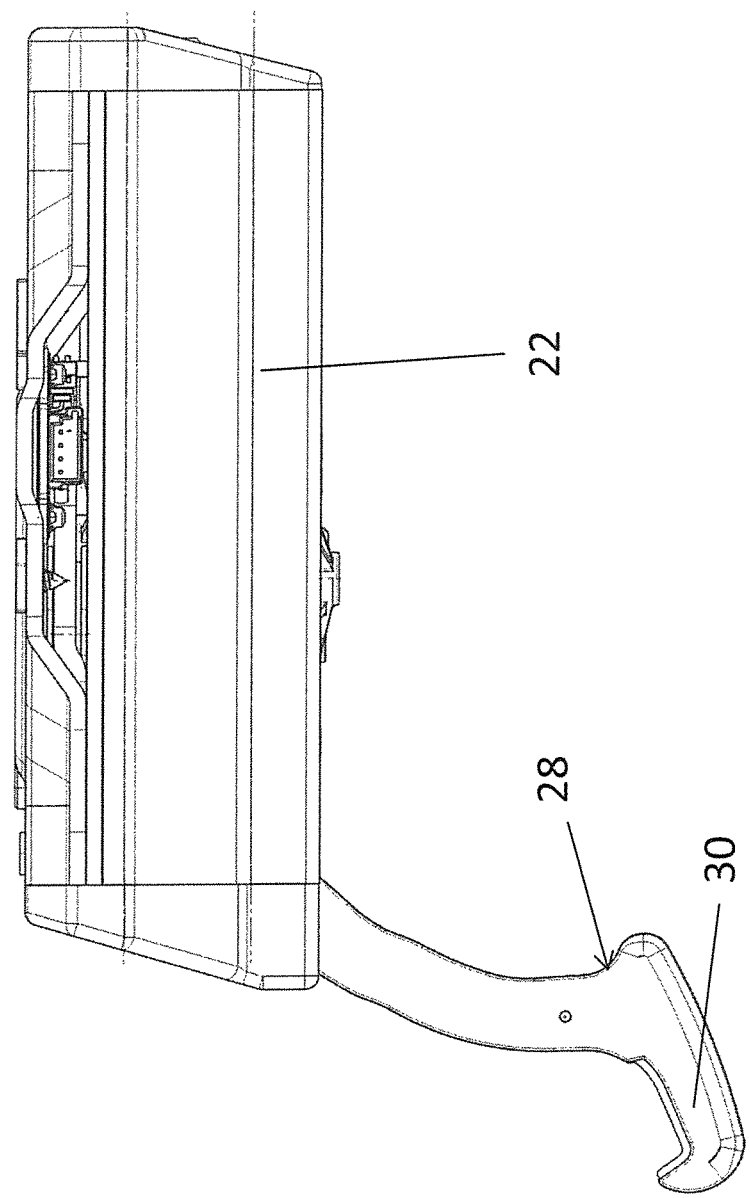
FIG. 6 shows a side view of the locking device when in its release position.

In FIG. 1, a convertible vehicle 10 is illustrated, which has a folding top 12, which can be displaced between a closed position, in which the vehicle interior is covered, and a storage position, in which the vehicle interior is open toward the top. In the closed position illustrated in FIG. 1, a front bow 14 of the folding top 12 is fixed to a front cowl 16 of the vehicle 10, said front cowl 16 being an upper frame part of a frame of a windshield 18, said frame part extending in the transverse direction of the vehicle 10.

The closed position of the folding top 12 is secured by means of a locking device 20, which is arranged at the underside of the front bow 14 and which is illustrated on its own in FIGS. 2 to 17. In the secured position, the locking device 20 takes up its locked position, whereas the locking device 20 is brought or shifted into its release position in order to displace the folding top 12.

The locking device 20 comprises a locking support 22, which has screw holes 24 for being fixed to the front bow and to which the other components of the locking device 20 are mounted or attached and which accommodates them at least in part. The locking support 22, which has a lid and a bottom, thus forms a casing of the locking device 20.

Figure 7:
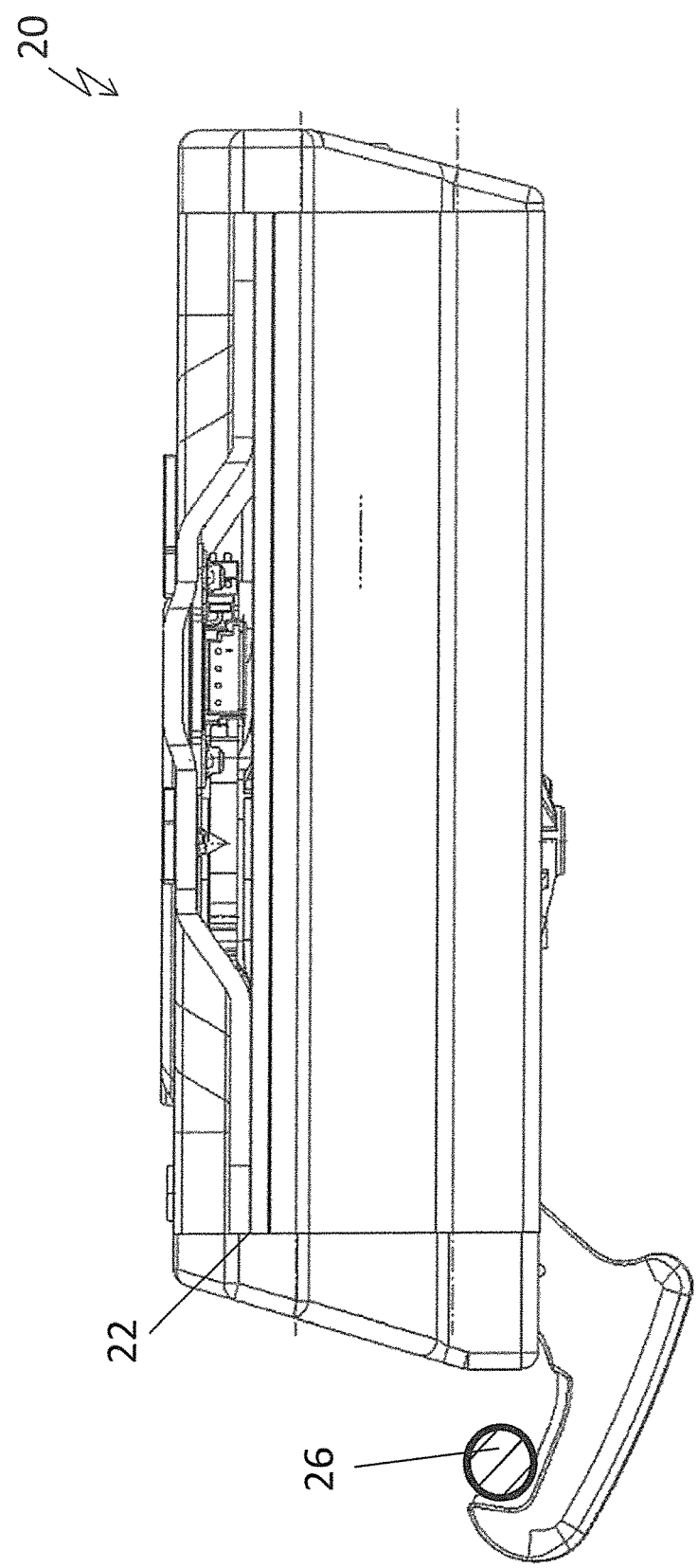
FIG. 7 shows a side view of the locking device when in its locked position corresponding to FIG. 6.
Figure 8:
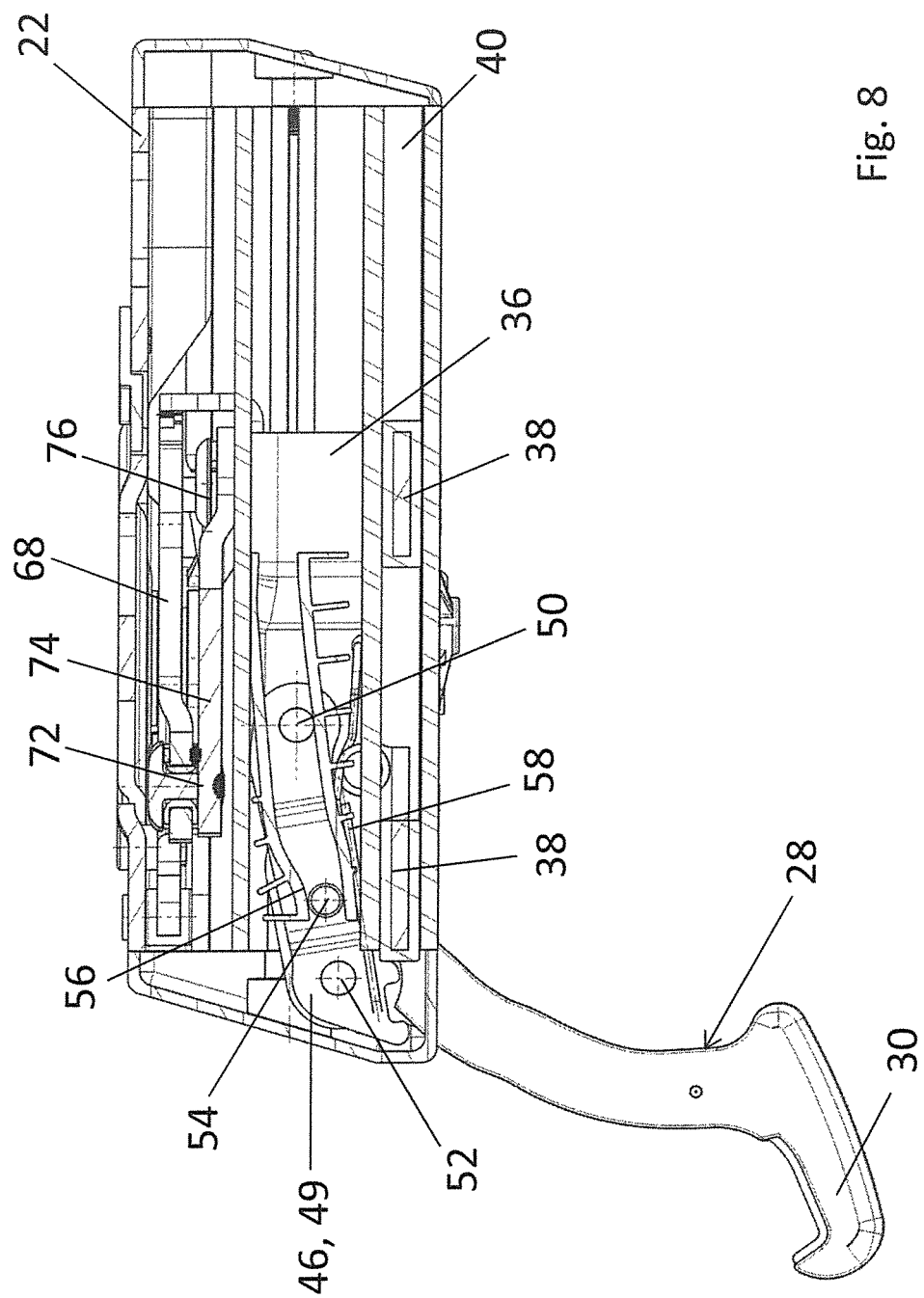
FIG. 8 shows a longitudinal cross-section of the locking device along line VIII-VIII in FIG. 14 when in its release position.
Figure 9:
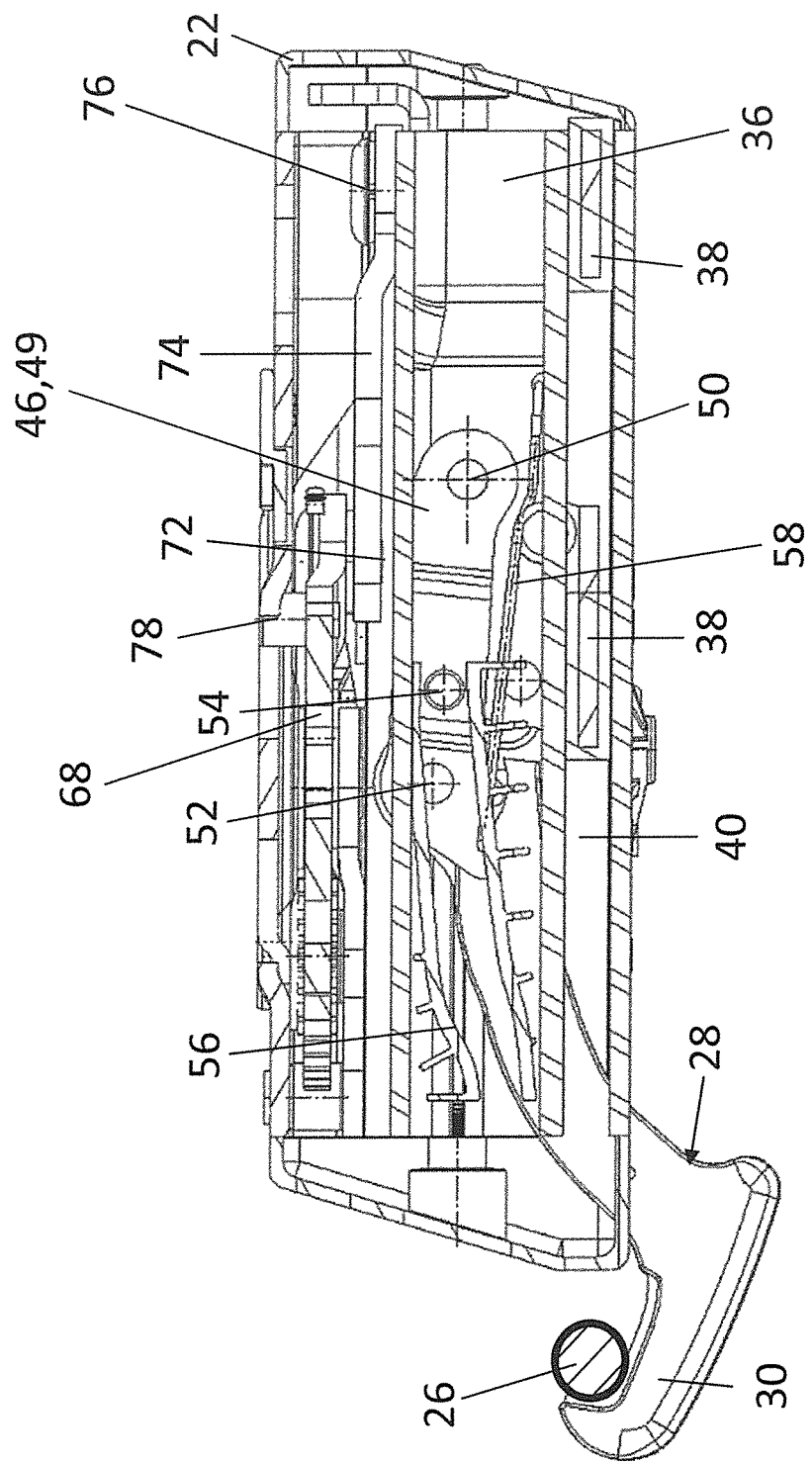
FIG. 9 shows a longitudinal cross-section corresponding to FIG. 8 through the locking device along line IX-IX in FIG. 15, but in its locked position.
Figure 10:
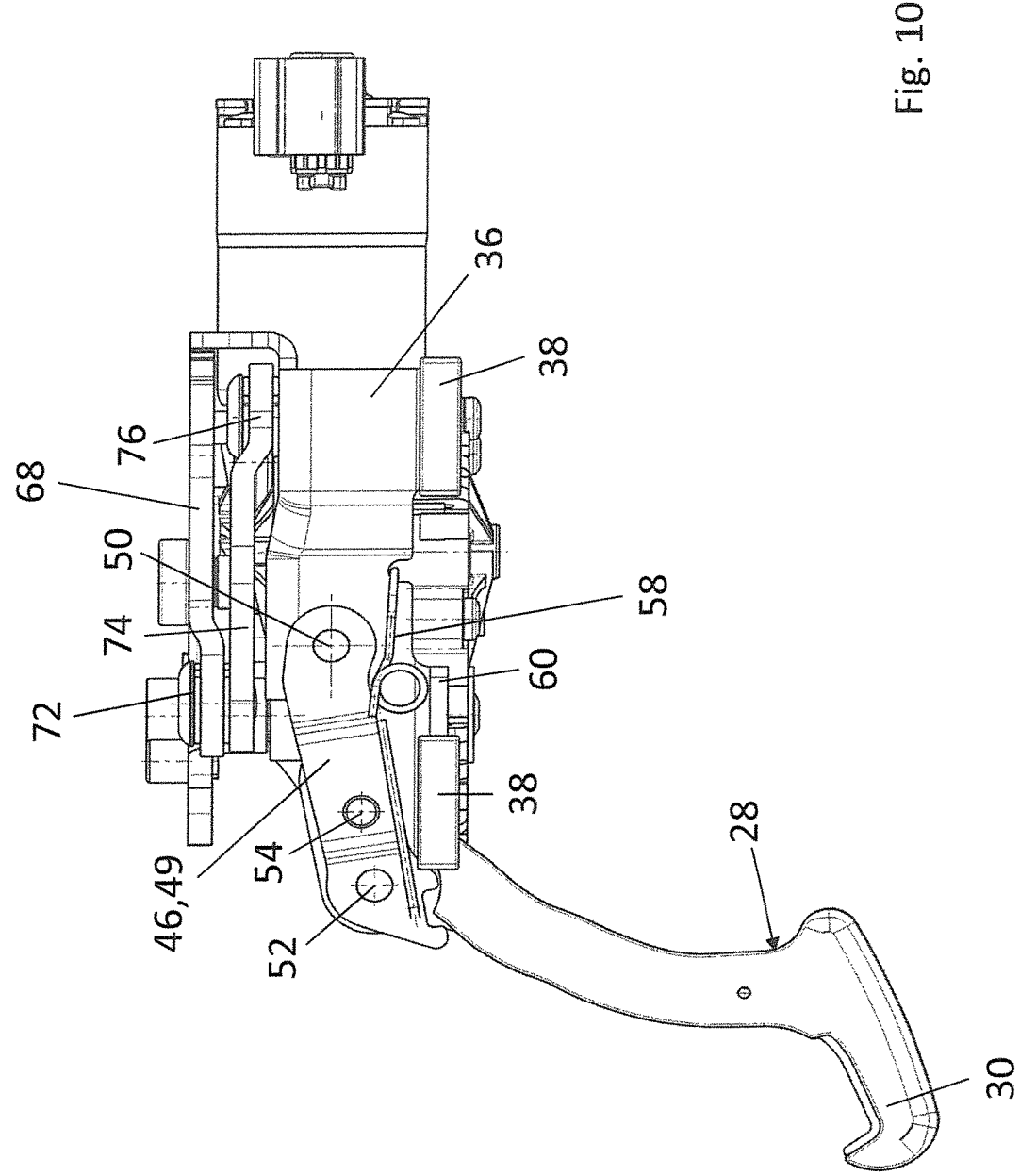
FIG. 10 shows a side view of the locking device when in its release position, but shown without the locking support.
Figure 11:
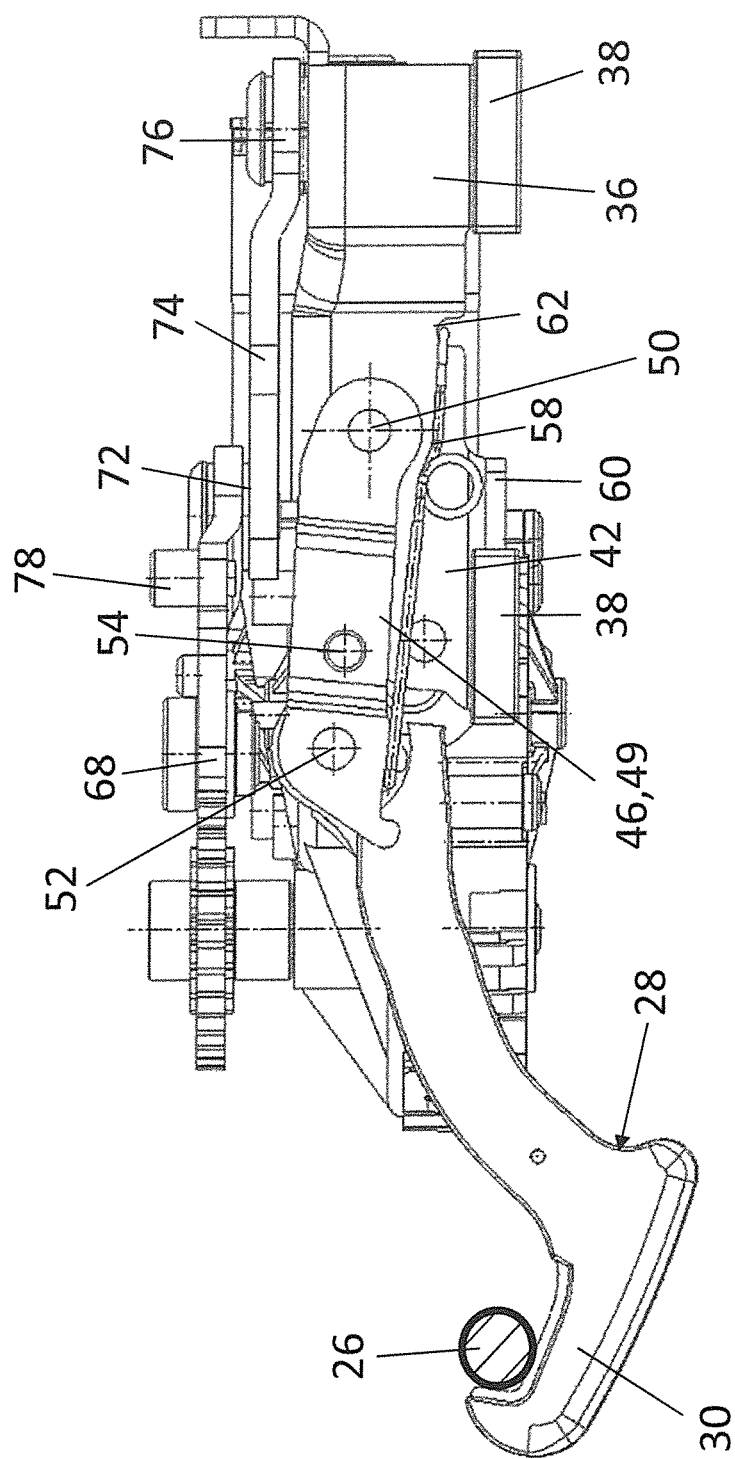
FIG. 11 shows a side view of the locking device corresponding to FIG. 10, but in its locked position.
Figure 12:
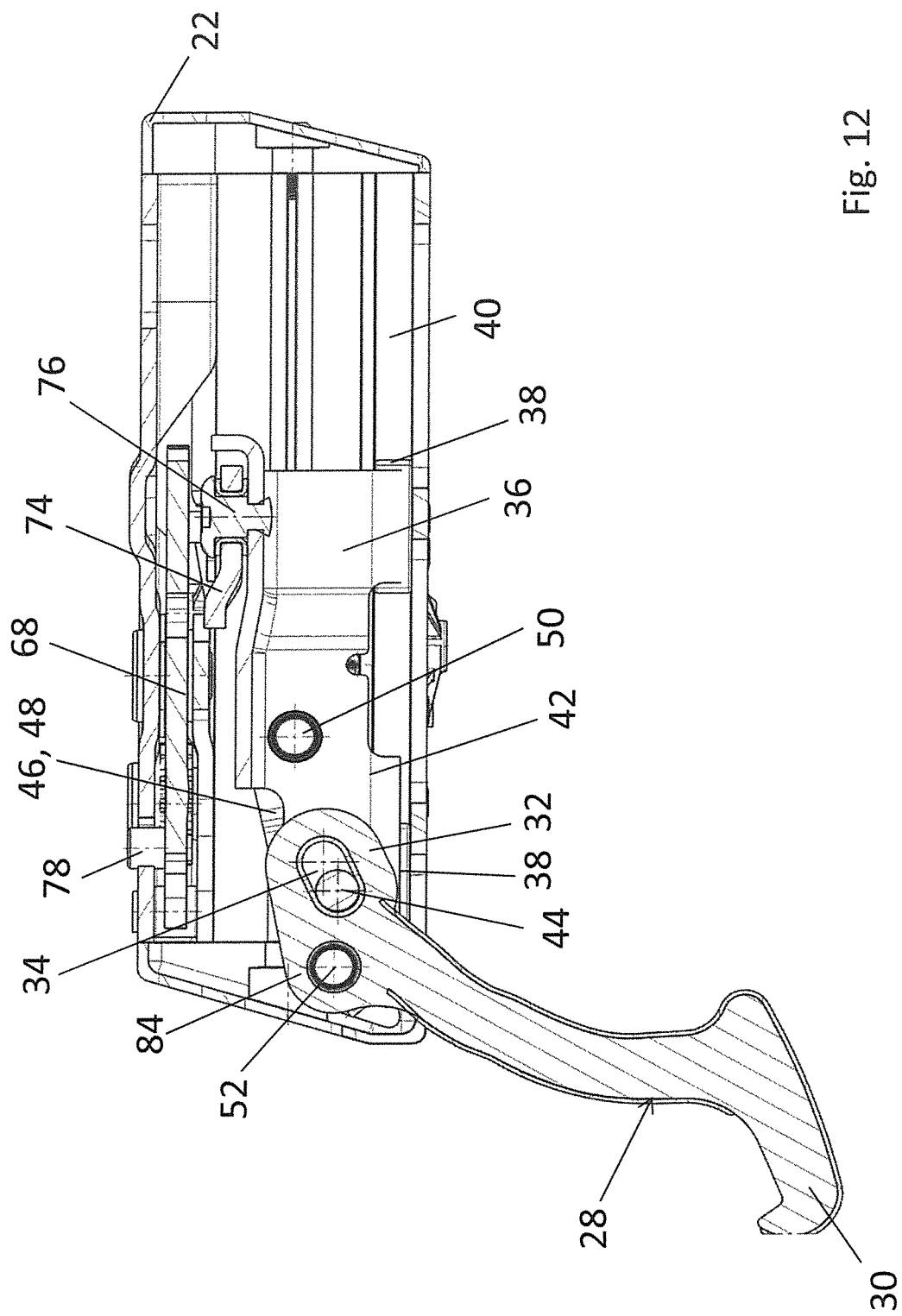
FIG. 12 shows another longitudinal cross-section through the locking device along line XII-XII in FIG. 14 when in its release position.
Figure 13:
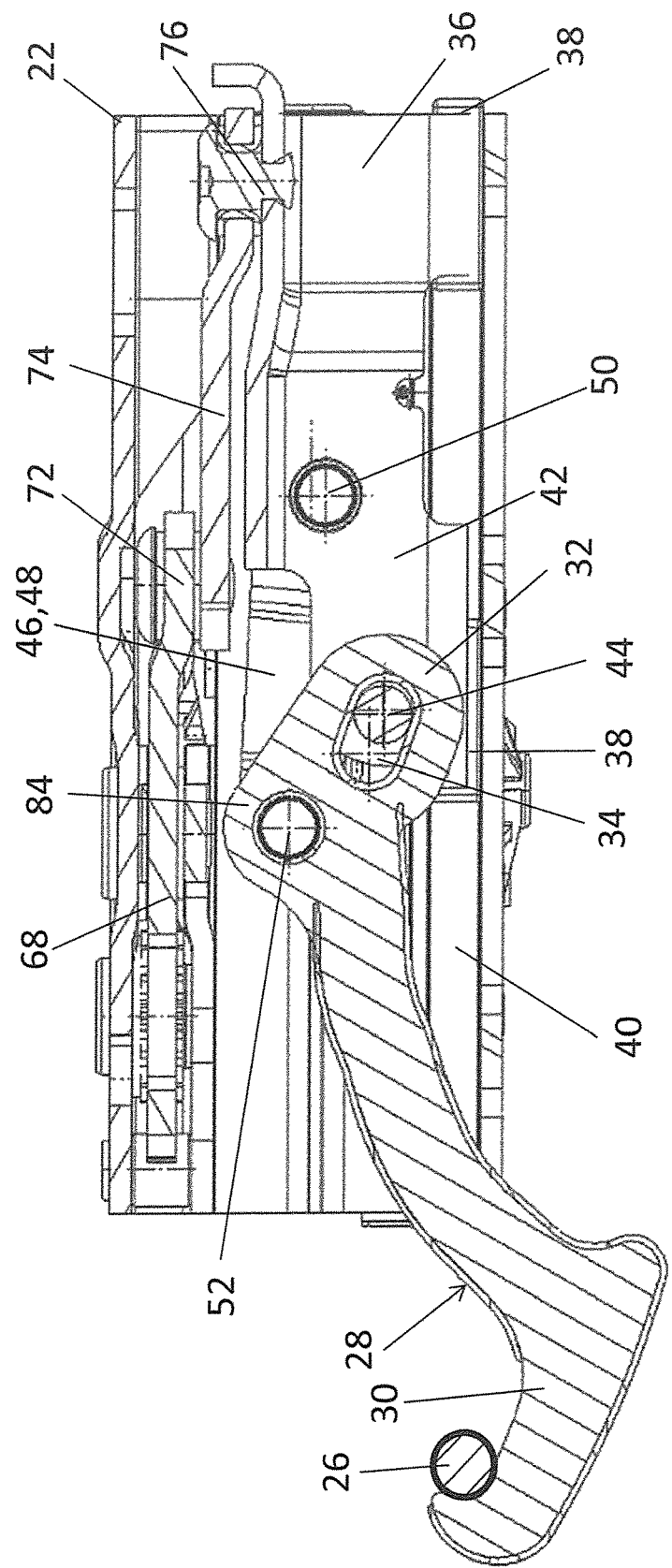
FIG. 13 shows a longitudinal cross-section corresponding to FIG. 12 along line XIII-XIII in FIG. 15 when in its locked position.

The locking device 20 comprises a locking hook 28 in order to become engaged with a locking bolt 26, which is arranged on the front cowl 16 of the vehicle structure and which is illustrated in FIGS. 7, 9 and 11. The locking hook 28 has a front hook section 30, which engages behind the locking bolt 26 of the front cowl 16 when in the locked position, and a rear bearing section 32, in which an oblong hole 34 is formed (cf. FIGS. 12 and 13).

For being driven, the locking hook 28 is connected to a slide 36, which has two sliding feet 38 on each of its two sides with respect to the vertical longitudinal center plane of the locking hook, said sliding feet 38 being guided in a guiding track 40 of the locking support 22.

The slide 36 has two lateral flanks 42, between which the rear hearing section 32 of the locking hook 28 is arranged and which are connected to each other via a journal 44 that penetrates the oblong hole 34 of the locking hook 28.

Between the slide 36 and the locking hook 28, a pull-link arrangement 46 is arranged, which is composed of two pull links 48 and 49, between which a front end of the slide 36 and the rear bearing section 32 and a driving section 84 of the locking hook 28 are arranged. The pull links 48 and 49 are each hinged to the slide 36 via a rear hinge point 50, which is formed by a bolt penetrating the slide 36. At their front ends, the pull links 48 are hinged to the driving section 84 of the locking hook 28 via a hinge point 52 defined by a journal.

At its outer side, the pull link 49 carries a journal-like guiding element 54, which is guided in a guiding track or slotted track 56, which is arranged on the inner side of the locking support 22. It defines upper and lower moving-curve limits.

In order to pre-load the locking hook 28 in the direction of its locked position, the locking device 20 has a leg spring 58, which rests on a protrusion 60 formed on the slide 36 and one leg of which engages into a groove 62 of the slide 36 and a second leg of which is in contact with the pull link 48 at the front-side end roughly below the hinge points 52 and pushes the pull link 48 upward.

At the underside of the casing-like locking support 22, which is composed of multiple parts, a driving motor 64 is arranged, which drives a driving pinion 66. The driving pinion 66 is engaged with a driving wheel 68, which can rotate about an axis A and which has a toothing 70 across an angle of about 120° to 160°, which is engaged with the toothing of the driving pinion 66. The driving wheel 68 has a connecting eye 72, via which a coupling link 74 is hinged thereto, the end of the coupling link 74 that faces away from the driving wheel 68 being hinged to the upper side of the slide 36 via a joint 76.

On its upper side, the driving wheel 68 carries a stop journal 78, which is guided in a slotted track 80 when the driving wheel rotates about axis A, said slotted track 80 running concentrically with respect to axis A and being formed on the casing, i.e. on the locking support 22. The edges of the slotted track 80 in the circumferential direction each form a counterstop for the stop journal 78, defining the release position of the locking hook 28 (cf. FIG. 14) on the one hand and the closed position of the locking hook 28 (cf. FIG. 15) on the other hand.

The locking device 20 described above is actuated in the manner described below.

Figure 14:
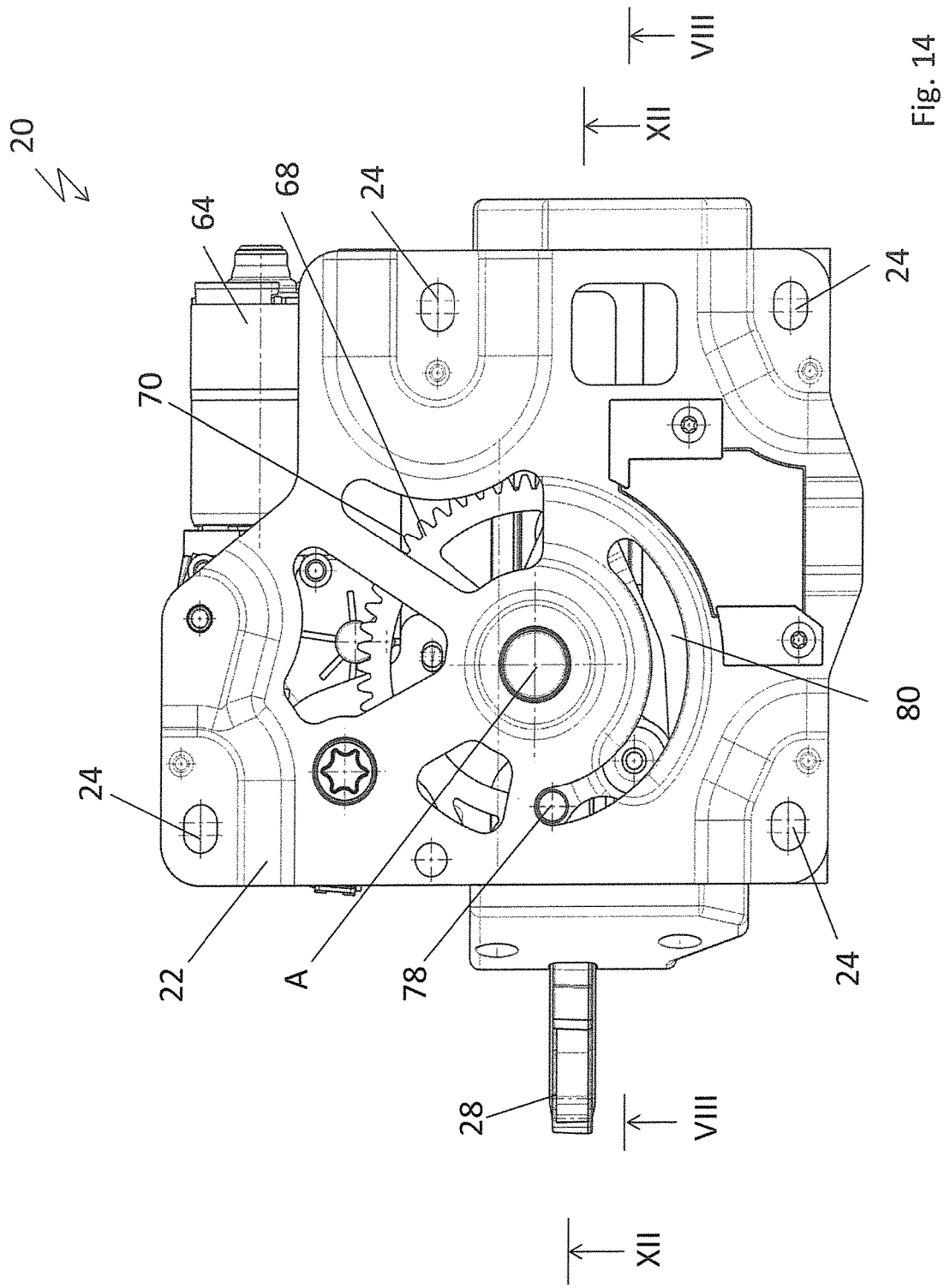
FIG. 14 shows a top view of the locking device when in its release position.
Figure 15:
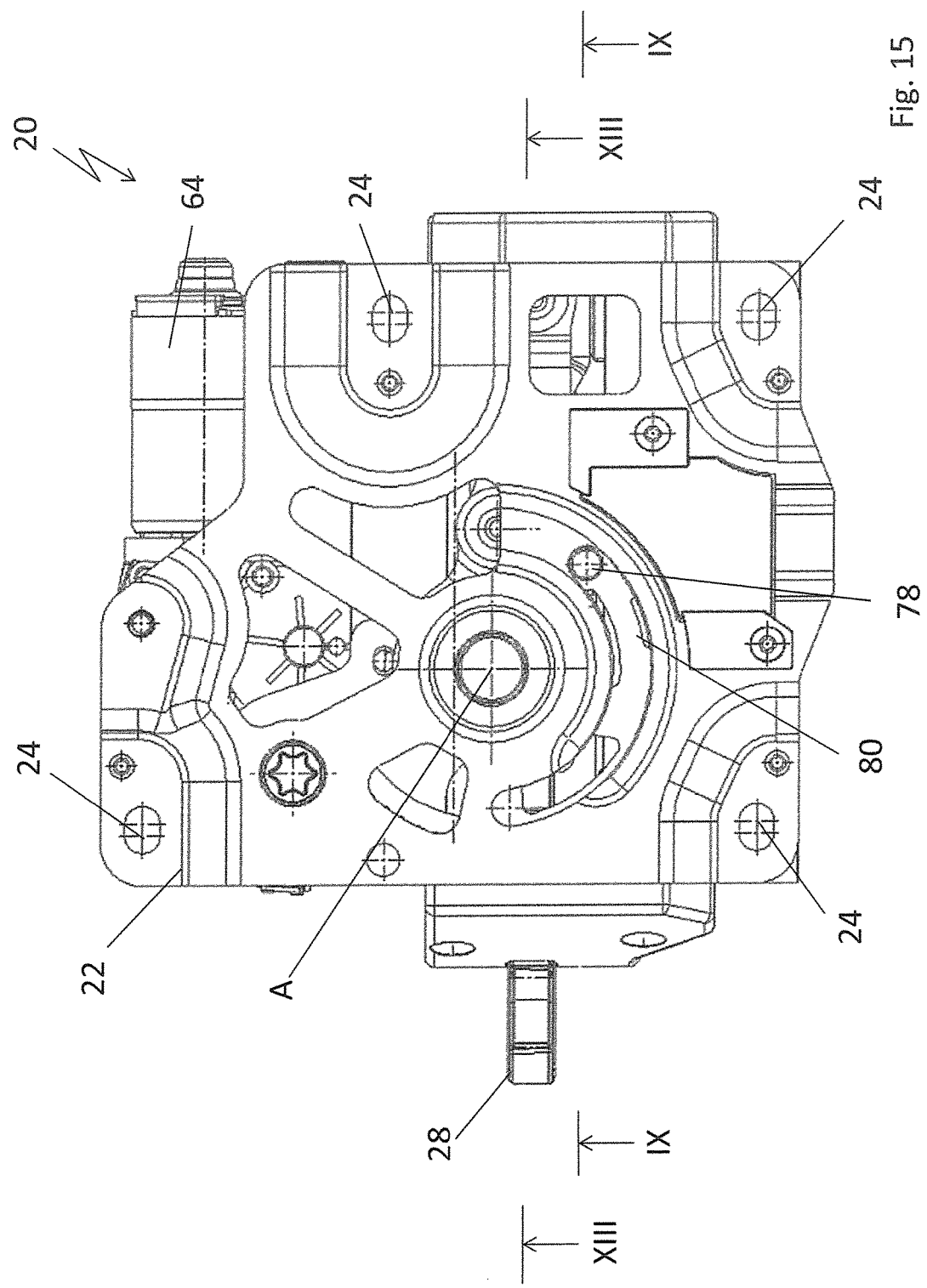
FIG. 15 shows a view corresponding to FIG. 14, but in the locked position of the locking device.
Figure 16:
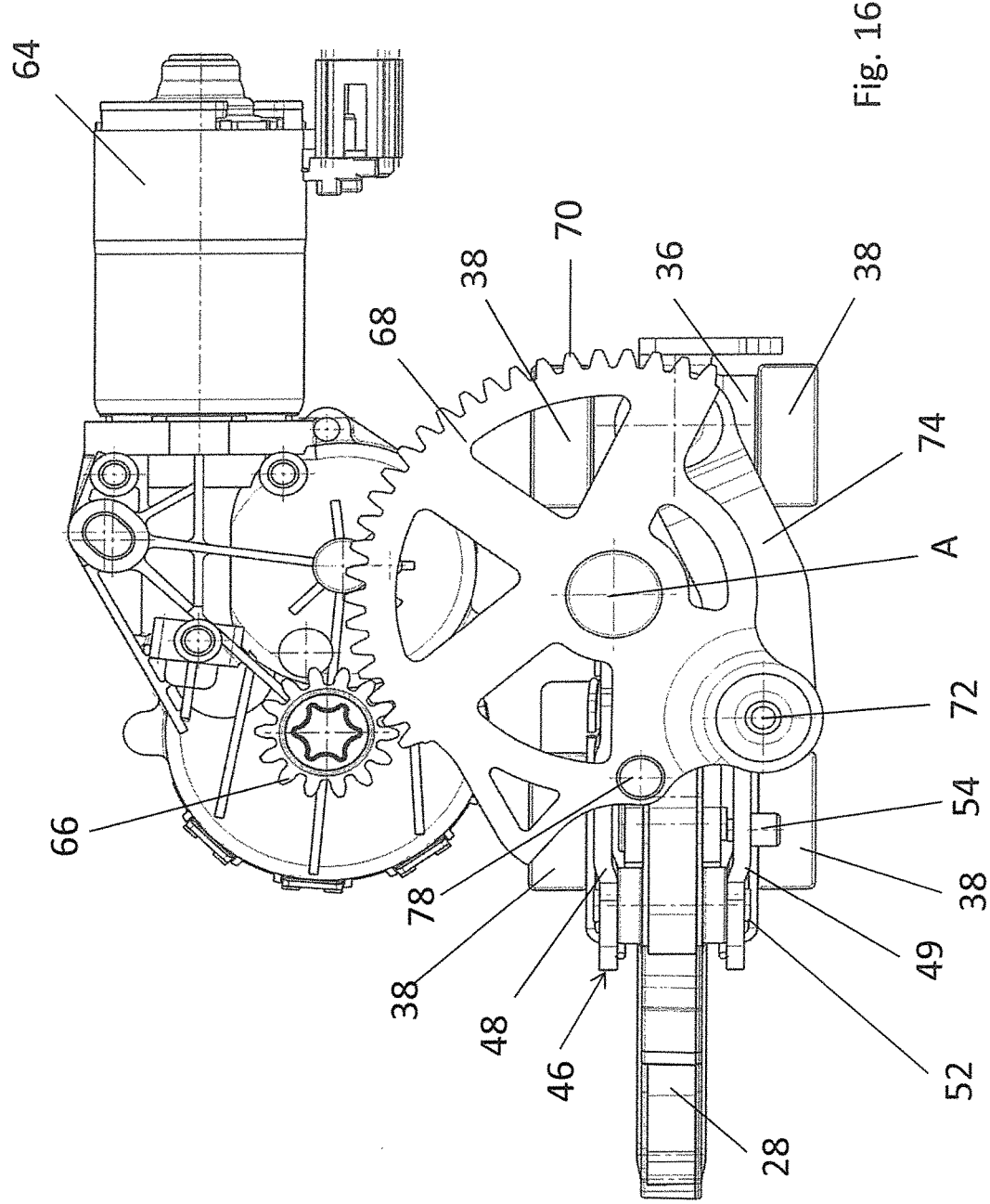
FIG. 16 shows a top view of the locking device when in its release position, shown without the locking support.
Figure 17:
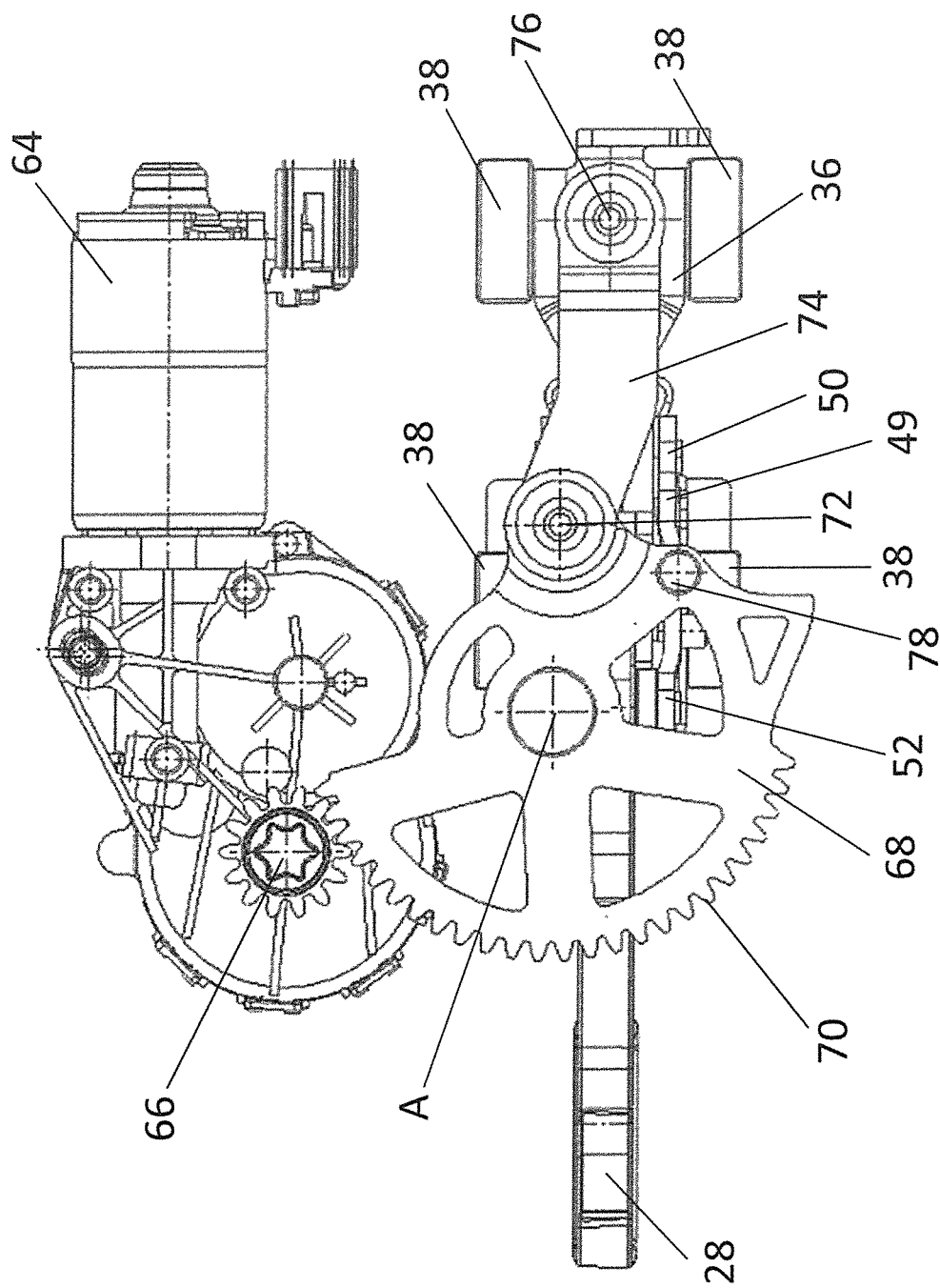
FIG. 17 shows a view of the locking device corresponding to FIG. 16, but in its locked position.

Starting from the release position of the locking device 20 as illustrated in FIG. 14, for example, the driving motor 64 is actuated in such a manner that the driving wheel 68 is rotated counterclockwise about axis A with respect to the orientation illustrated in FIGS. 14 to 17. In this way, the driving wheel 68 exerts thrust on the slide 36 via the coupling link 74, a pulling force thus being exerted on the locking hook 28 via the pull links 48. The locking hook 28 is thus pulled into the locking support 22 through a front-side and bottom-side slot 82, while at the same time being pivoted clockwise with respect to the orientation illustrated in FIGS. 6 to 13, namely about a pivot axis that travels with the journal 44 in the oblong hole. The pivoting movement is caused by the pulling force exerted by the pull links 48 on the driving section 84 of the locking hook 28, in which the hinge point 52 is formed and which is offset from a connecting line between the bearing section 32 and the hook section 30 of the locking hook 28. Additionally, the pivoting movement is controlled by the guiding element 54, which is guided in the guiding track 56.

When adjusting the locking hook, the hook section 30 engages into a recess formed on the front cowl 16, a counterforce thus acting on the front bow 14 upon contact with the locking bolt 26, said counterforce pulling the front bow 14 downward. This is helpful since external forces usually push the front bow 14 to take up a higher position than that of the nominal position. This pushing action can be caused by the tension of a top cover or by a negative pressure occurring when the top is being closed during normal driving.

Figure 18:
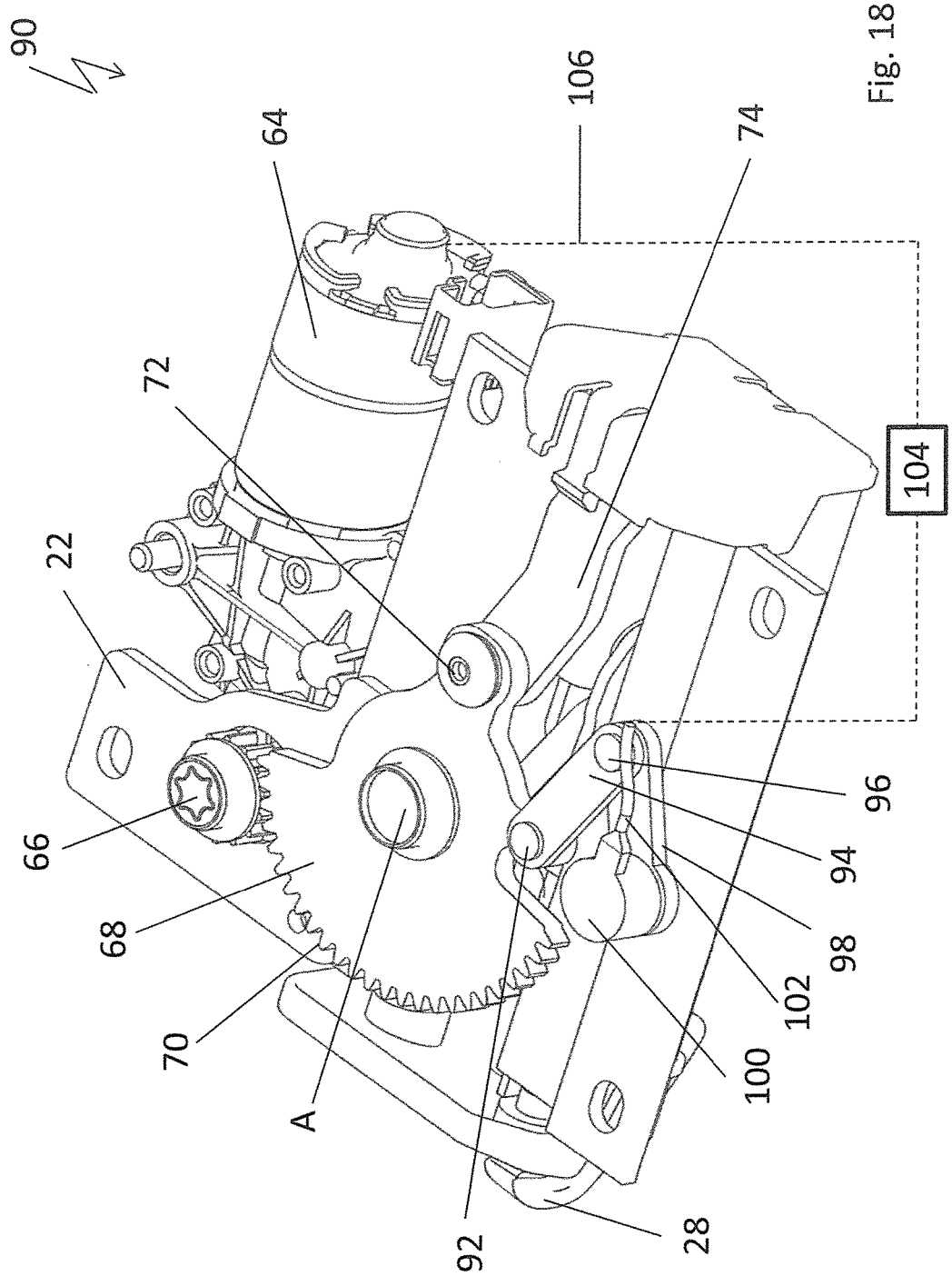
FIG. 18 shows a perspective top view of a locking device according to the invention shown without a locking-support lid.

In FIG. 18, a locking device 90 is illustrated which is realized according to the invention. The design of this locking device mostly corresponds to the design of the locking device illustrated in FIGS. 2 to 17 so that only the differences are described below.

The locking device 90 illustrated without an upper lid of a locking support 22 in FIG. 18 also comprises a driving wheel 68, which is provided with a toothing 80 formed across an angle of approximately 120° to 160° at the periphery and is engaged with a driving pinion 66, which can be driven by a driving motor 64. The driving wheel 68 is connected to a coupling link 74 via a connecting eye 72, said coupling link 74 driving a slide according to the embodiment shown in FIGS. 2 to 17, said slide being connected to a locking hook 28 via a pull-link arrangement.

In the peripheral direction, the driving wheel 68 has another connecting eye 92 arranged at an offset to the connecting eye 72, a coupling lever 94 being hinged to said connecting eye 92 and forming a cranking mechanism in conjunction with the driving wheel 68 and being connected to a positioning lever 98 of a rotation sensor 100 via a hinge point 96. The rotation sensor 100 is secured to the locking support 22 and connected to a motor control 104 via a conduit 102, which is connected to the driving motor 64 via a line 106.

The rotation sensor 100 is a magnetically operating rotation sensor, which continually detects the rotational position of the driving wheel 68 with respect to the locking support 22 in dependence of the rotational position of the positioning lever 98. By this means, the position of the locking hook 28 can be determined, which is driven by means of the driving wheel 68 in regard of the end position of the locking hook as well as in regard of each intermediary position of the locking hook between the end positions. Stop journals for the driving wheel 68 are therefore not necessarily required.

For the rest, the locking device 90 corresponds to the locking device illustrated in FIGS. 2 to 17, thus referring to the description above for further details.

Figure 19:
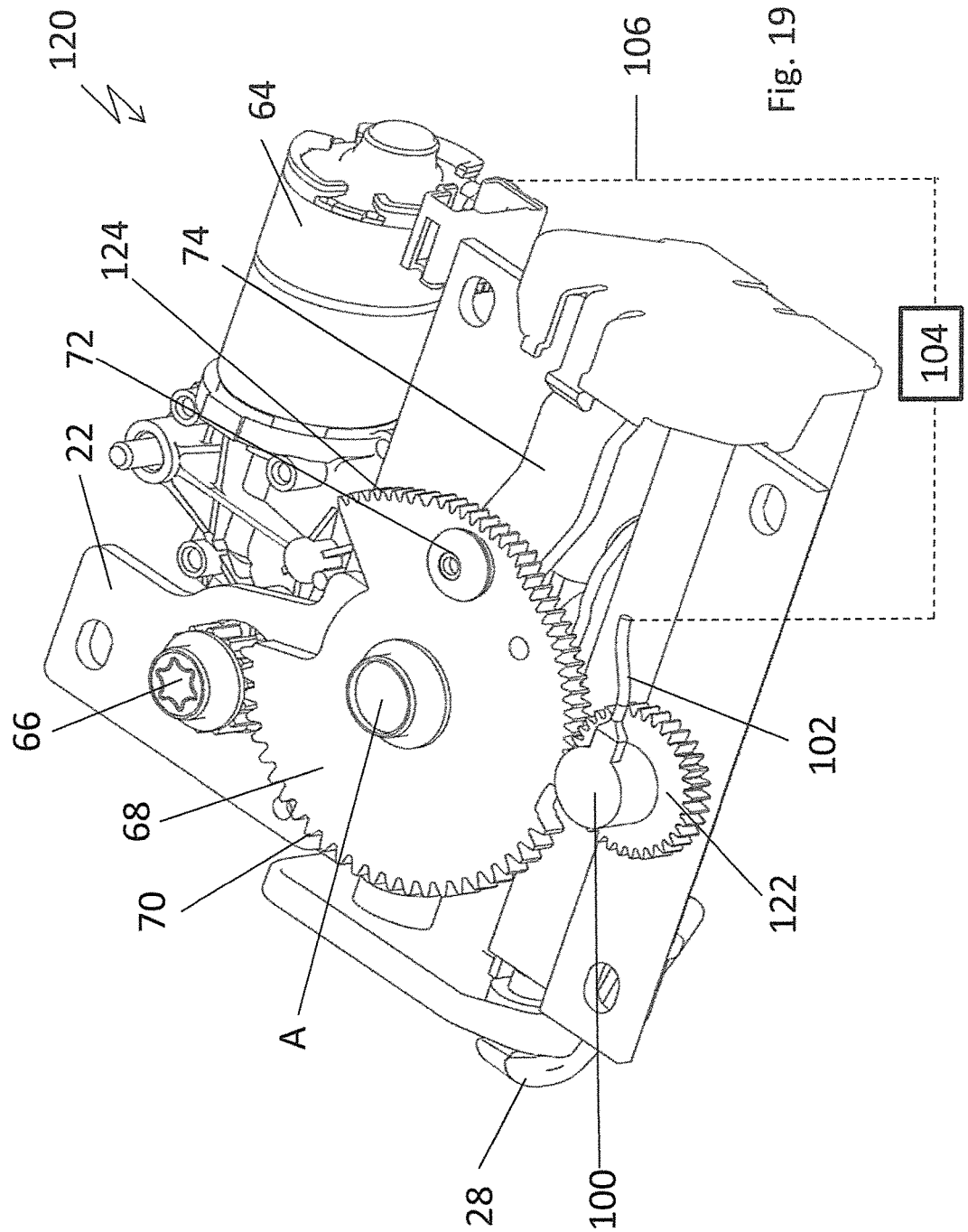
FIG. 19 shows a perspective top view of an alternative embodiment of a locking device according to the invention, also shown without a locking-support lid.

In FIG. 19, an alternative embodiment of a locking device 120 is illustrated, which mostly corresponds to the locking device illustrated in FIG. 18 but differs in the respect that it has a driving wheel 68, which has another toothing 124 at its periphery, said toothing 124 extending across an angle area of approximately 140° to 180° and being engaged with a gearwheel 122, which is a positioning wheel of a rotation sensor 100 secured to the locking support 22. The toothing 124 therefore extends in the peripheral direction of the driving wheel 68 across the same angle area as the toothing 70, which is engaged with the driving pinion 66. In dependence of the rotational position of the gearwheel 122, the rotational position of the driving wheel 68 can thus be continuously determined with respect to the locking support 22. As in the embodiment illustrated in FIG. 18, the rotation sensor 100 is connected to a motor control 104 via a line 102, said motor control 104 in turn being connected to the driving motor 64 via a line 106.

The translation between the driving wheel 68 and the gearwheel 122 is chosen so that the gearwheel 122 executes a rotation of 350° and 360° when displacing the locking hook 28 between its locked position and its release position, i.e. between its end positions.

For the rest, the locking device 120 corresponds to the locking device illustrated in FIG. 18.

Figure 20:
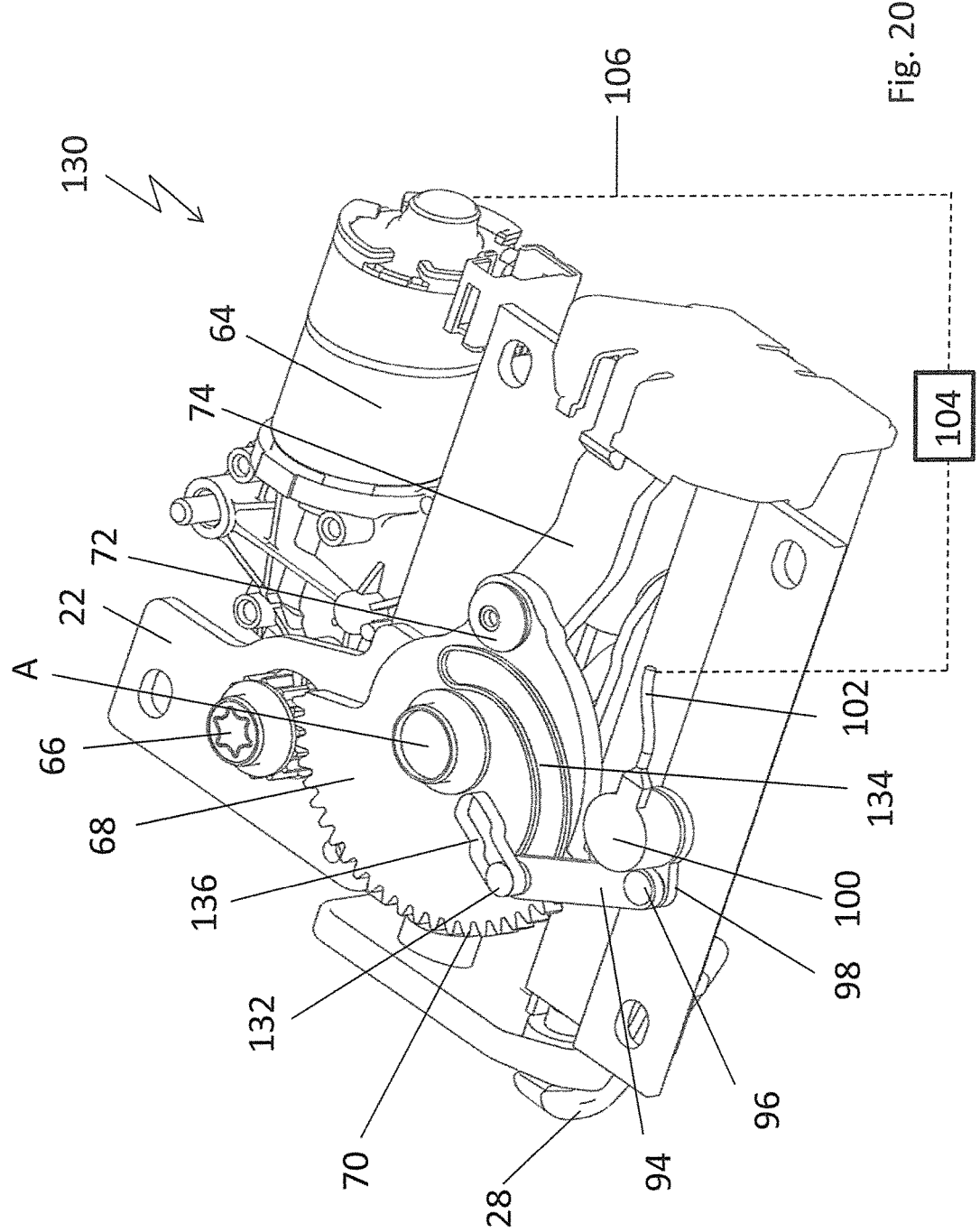
FIG. 20 shows a perspective top view of a third embodiment of a locking device according to the invention, also shown without a locking-support lid.

In FIG. 20, another embodiment of a locking device 130 is illustrated, which mostly corresponds to the locking device illustrated in FIG. 18 but differs in the respect that it comprises a rotation sensor 100, which is secured to the locking support 22 and comprises a positioning lever 98 connected to a coupling lever 94 via a hinge point 96, said coupling lever 94 comprising a guiding journal 132, which extends perpendicular to the plane of the driving wheel 68 and engages with a slotted track 134 formed on the driving wheel 68. The slotted track 134 has an eccentric progression, i.e. it follows a spiral line.

Furthermore, another slotted track 136 is formed on an upper lid, not further illustrated, of the locking support 22, said slotted track 136 extending in a radial direction with respect to rotation axis A of the driving wheel 68 and being penetrated by guiding journal 132. By displacing the driving wheel 68, the guiding journal 132 is shifted in its radial direction due to the progression of the slotted track 134 so as to exert a displacing moment onto the positioning lever 98 via the coupling lever 94, whereby in turn the rotational position of the driving wheel 68 can be detected by means of the rotation sensor 100, allowing, in turn, the position of the driving hook 28 to be detected.

For the rest, the locking device 130 corresponds to the locking device illustrated in FIG. 18.

Figure 21:
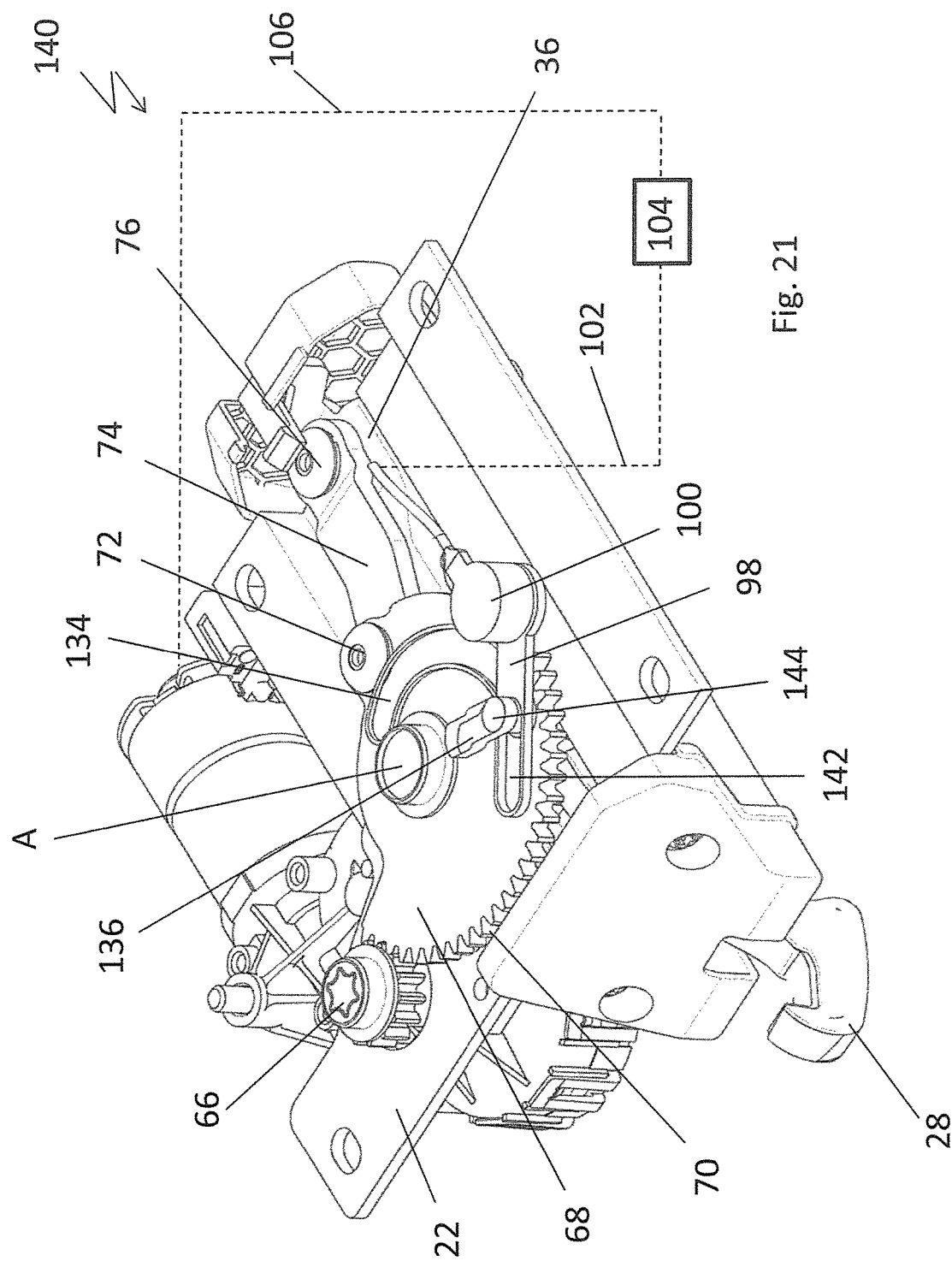
FIG. 21 shows a perspective top view of a fourth embodiment of a locking device according to the invention, also shown without a locking-support lid.

In FIG. 21, another embodiment of a locking device 140 according to the invention is illustrated, which mostly corresponds to the locking device according to FIG. 20 but differs in the respect that it comprises a rotation sensor 100, which is not operatively connected to the driving wheel 68 via a coupling lever. Indeed, the rotation sensor 100 comprises a positioning lever 98, on which an oblong hole 142 extending toward the axis of the positioning lever 98 is formed and penetrated by a guiding journal 144. According to the embodiment from FIG. 20, the guiding journal 144 penetrates a slotted track 134, which is formed on the driving wheel 68 and follows a spiral line, with its lower end and a slotted track 136, which has a radial progression with respect to rotation axis A of the driving wheel 68 and is formed on a lid, not further illustrated, of the locking support 22, with its upper end.

Actuating the driving wheel 68 causes a shift of the guiding journal 144 in the slotted track, i.e. in its radial direction with respect to the rotation axis of the driving wheel 68, so that the positioning lever 98 of the rotation sensor 100 is pivoted and the corresponding rotational position of the driving wheel 68 can be detected by means of the rotation sensor 100. For this purpose, the guiding journal 144 is also moved in the oblong hole 142 of the positioning lever 98.

For the rest, the locking device 140 corresponds to the locking device illustrated in FIG. 20.

The invention claimed is:

1. A locking device of a convertible vehicle, comprising a locking support, a locking hook, which can be shifted in a translational and/or rotational manner so as to be displaced between a release position and a locked position, and a driving mechanism for the locking hook, said driving mechanism comprising a driving element, which is driven by a driving motor and drives the locking hook, as well as a detection device for detecting a position of the driving element, wherein the detection device is a sensor, which continuously detects the position of the driving element with respect to the locking support.

2. The locking device according to claim 1, wherein the driving element is a driving wheel and the sensor is a rotation sensor, which continuously detects the rotational position of the driving wheel with respect to the locking support.

3. The locking device according to claim 2, wherein the driving wheel interacts with the rotation sensor via a geardrive.

4. The locking device according to claim 3, wherein the geardrive comprises a gearwheel, which is allocated to the rotation sensor and engages with a toothing of the driving wheel.

5. The locking device according to claim 3, wherein the geardrive comprises a cranking mechanism, which is hinged to the driving wheel and acts on a positioning lever of the rotation sensor.

6. The locking device according to claim 2, wherein the driving wheel comprises a slotted track for a positioning device of the rotation sensor, said positioning device comprising a positioning lever.

7. The locking device according to claim 6, wherein the positioning device comprises a coupling lever, which is guided by the slotted track and is hinged to the positioning lever of the rotation sensor.

8. The locking device according to claim 6, wherein the positioning lever comprises an oblong hole, into which a journal engages, which is guided in the slotted track.

9. The locking device according to claim 6, wherein a slotted track is formed on the locking support, said slotted track being positioned at least nearly radially with respect to the rotation axis (A) of the driving wheel and a guiding journal of the positioning device of the rotation sensor being guided in said slotted track.

10. A locking device of a convertible vehicle, comprising a locking support, a locking hook, which can be shifted in a translational and/or rotational manner so as to be displaced between a release position and a locked position, and a driving mechanism for the locking hook, said driving mechanism comprising a driving element, which is driven by a driving motor and drives the locking hook, as well as a detection device for detecting a position of the driving element, wherein the detection device is a sensor, which continuously detects the position of the driving element with respect to the locking support, wherein the driving wheel comprises a linear drive, in particular a hydraulic drive, and the sensor is a linear sensor, which continuously detects the relative position of the driving element with respect to the locking support.

11. A top of a convertible vehicle, comprising a locking device according to claim 1 for fixing a top element to a front cowl of the vehicle.

\* \* \* \* \*